(No Model.) 4 Sheets—Sheet 2.
J. F. PACKER.
WHEEL PLOW.
No. 353,497. Patented Nov. 30, 1886.
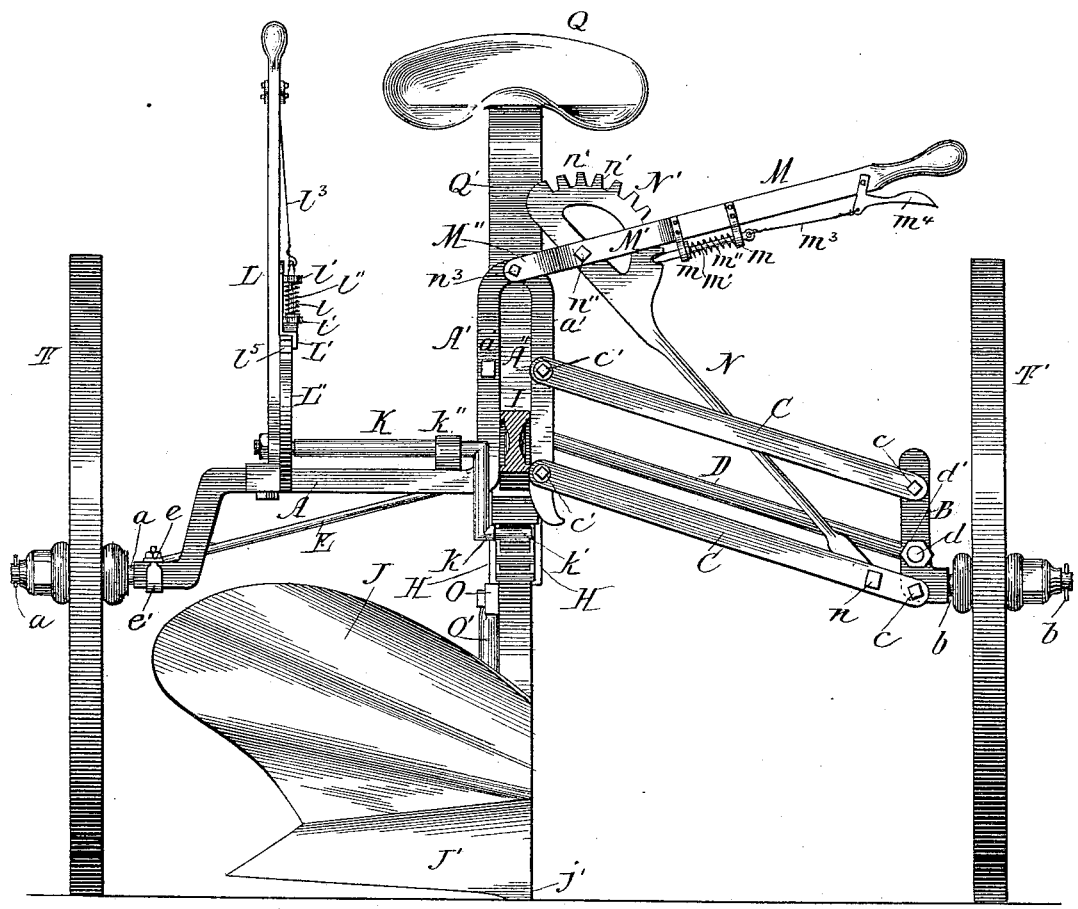
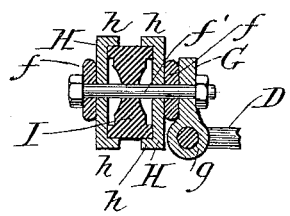
Witnesses:
Albert H. Adams.
Harry T. Jones.
Inventor:
John F. Packer,
By West & Bond,
attys.

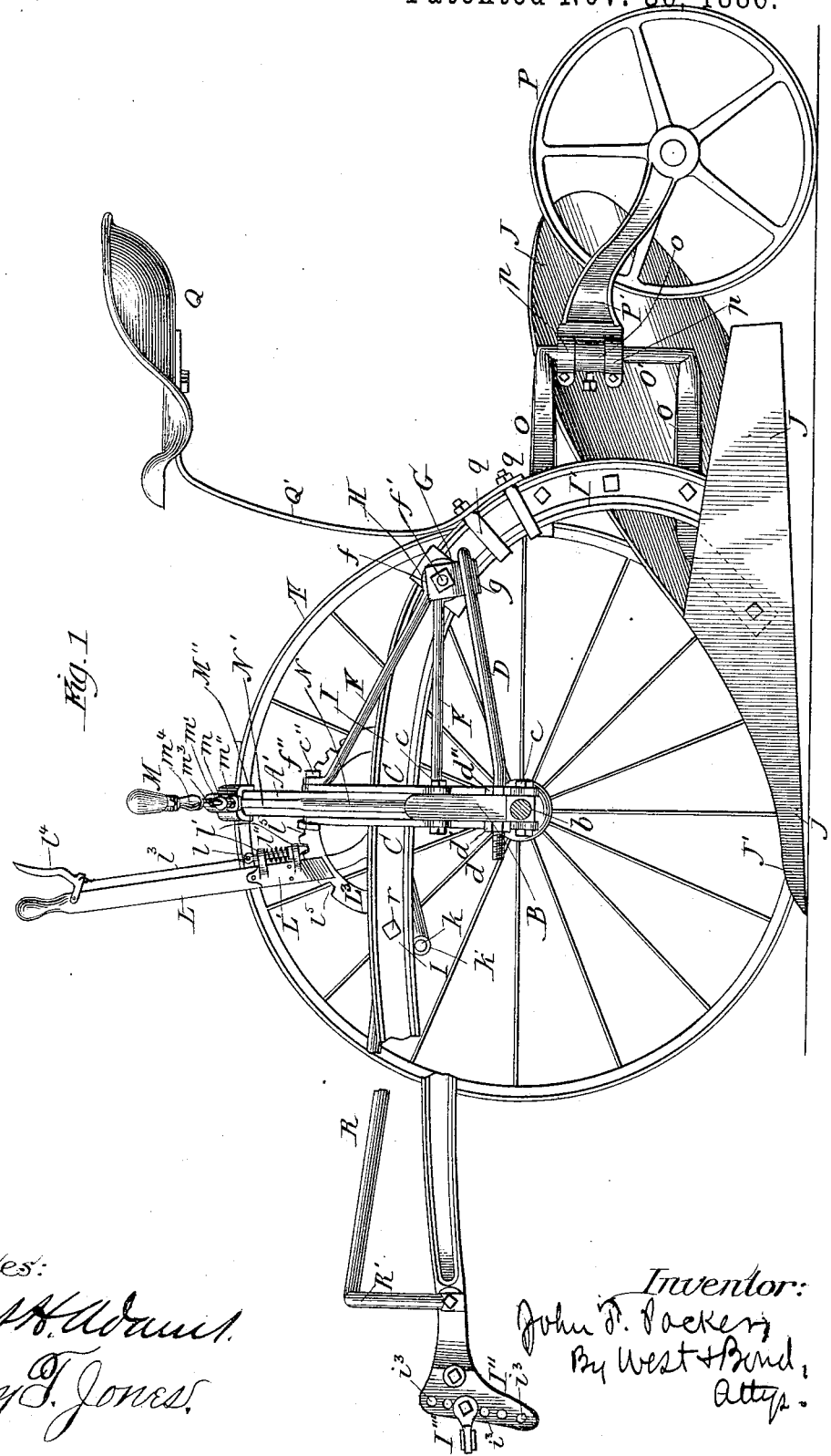

(No Model.) 4 Sheets—Sheet 3.
J. F. PACKER.
WHEEL PLOW.
No. 353,497. Patented Nov. 30, 1886.
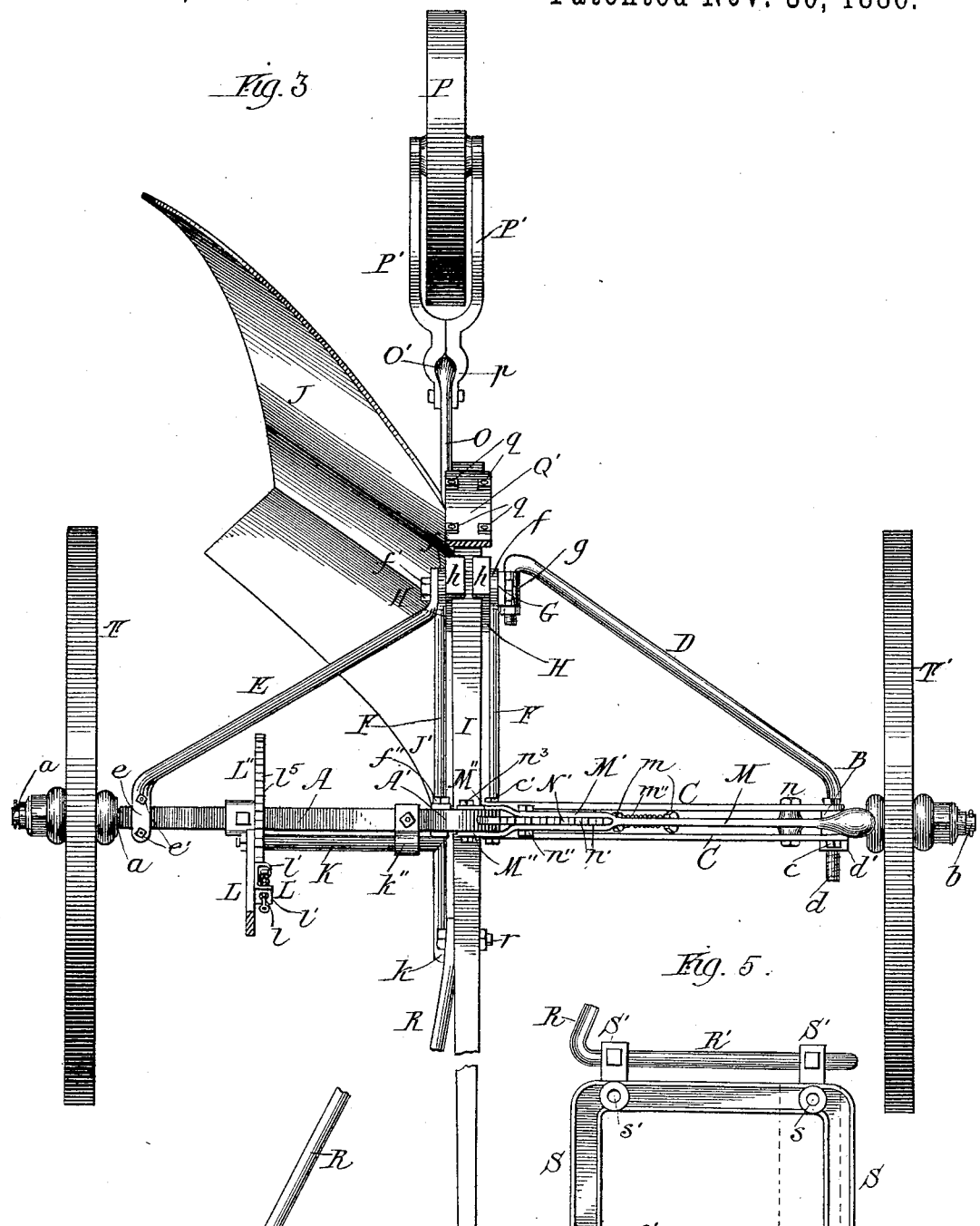
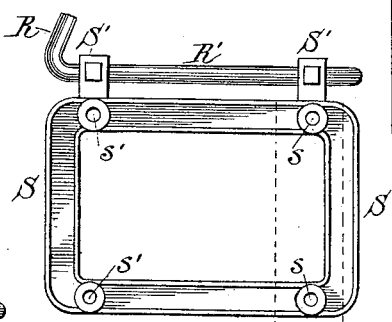
Witnesses
Albert H. Adams
Harry T. Jones
Inventor
John F. Packer
By West & Bond
Attys.

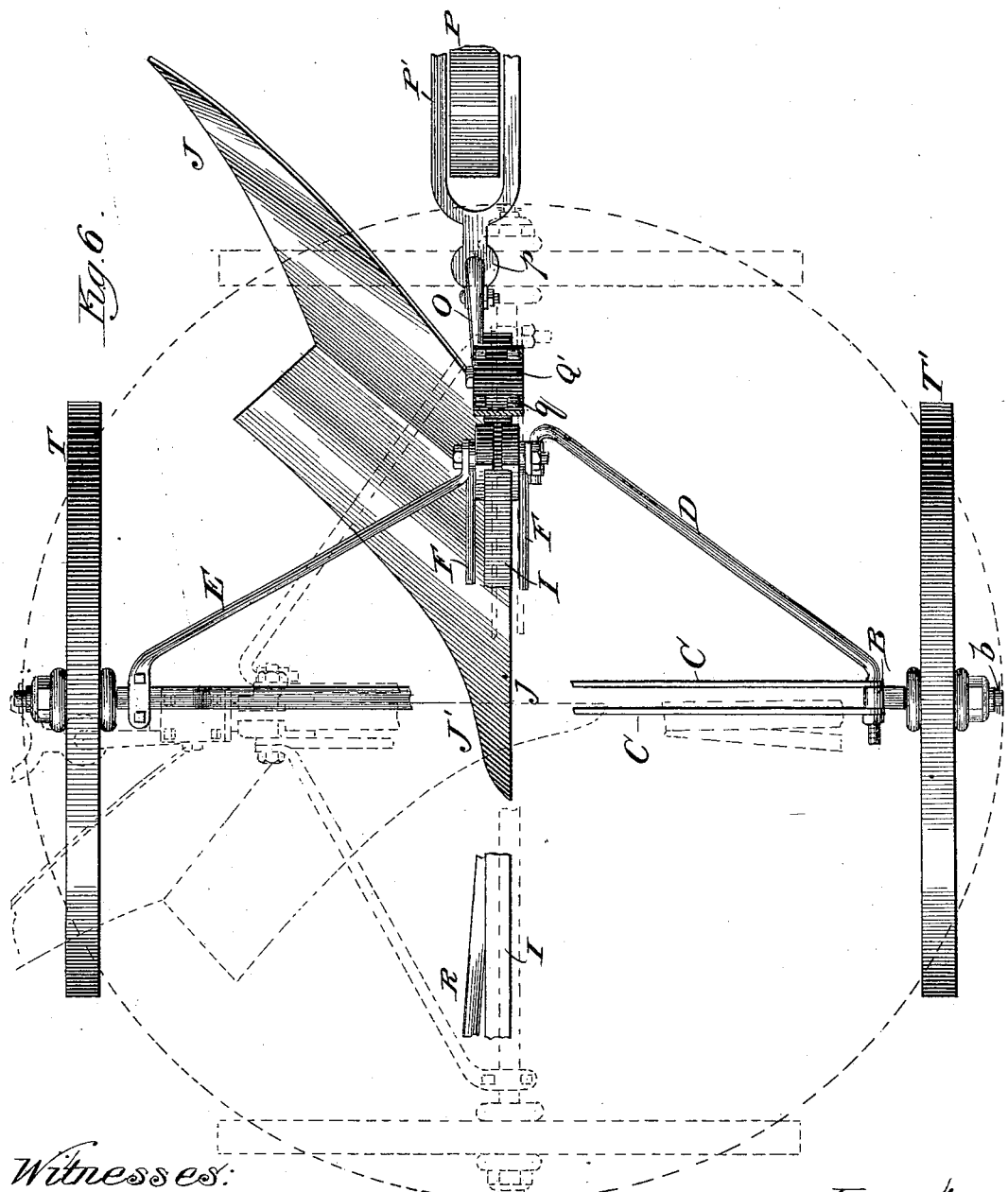

UNITED STATES PATENT OFFICE.

JOHN F. PACKER, OF CHICAGO, ILLINOIS, ASSIGNOR TO THE DAVID BRADLEY MANUFACTURING COMPANY, OF SAME PLACE.

WHEEL-PLOW.

SPECIFICATION forming part of Letters Patent No. 353,497, dated November 30, 1886.

Application filed March 9, 1886. Serial No. 194,659. (No model.)

*To all whom it may concern:*

Be it known that I, JOHN F. PACKER, residing at Chicago, in the county of Cook and State of Illinois, and a citizen of the United States, have invented a new and useful Improvement in Three-Wheeled Plows, of which the following is a full description, reference being had to the accompanying drawings, in which—

Figure 1 is a sectional side elevation with the beam and hitch-rod broken out; Fig. 2, a front elevation with the beam in section; Fig. 3, a top or plan view with the seat removed and the seat-standard in section; Fig. 4, a detail showing the attachment of the link for the land-wheel standard to the beam; Fig. 5, a detail of the hitch, and Fig. 6 a plan view of parts of the plow, showing the manner in which it can turn on its center.

This invention relates to that class of plows which have been termed "three-wheeled," and in which two carrying-wheels are employed, with a guiding or supporting wheel at the rear end of the plow to facilitate turning, and has for its objects to give the land-wheel a support wholly independent of the furrow side of the machine, by which it can be adjusted to produce the proper level; to give the plow-frame a pivoted support at or near the standard, by which it is free to oscillate in operating the plow; to support the plow at a point to produce a resistance on the rear wheel, so that the plow will be raised bodily, in running, out of the ground; to allow the beam free play independent of the lifting-lever, by which its forward end is raised to run the plow out of the ground, leaving the carrying-wheels free to ride over obstructions without changing the draft of the plow or affecting its running depth; to permit the plow to be attached or detached without removing the rear wheel, by making the attachment for the wheel direct to the beam; to give the plow the same suction after the point has become worn in use as when it first started; to give the plow a support by which the point moves in the arc of a circle through the wheels and in the arc of a circle in line with the center of the axle, the turning-point being a little back of the extreme point of the plow, so that in turning the plow in the ground it will swing without affecting the frame and will ride on the point, leaving the wheels free to travel around in a true circle without straining the frame, and to improve generally the construction and operation of the machine as a whole; and its nature consists in the several parts and combinations of parts hereinafter described, and pointed out in the claims as new.

In the drawings, A represents the horizontal portion of the frame or axle, the inner end of which is joined to the vertical portion A', which portion is formed of two arms, a', leaving a slot or space, A'', between them. The horizontal portion A may be formed, as shown in Fig. 2, with a downwardly-extending end, which is turned to stand parallel with the main or body portion, and has at its end the spindle a, for the carrying-wheel, which runs in the furrow.

B is a standard, having its lower end turned at right angles and provided with a spindle, b, for the land-wheel.

C represents bars running from the standard B to the vertical portion A' of the frame. The bars C at one end are pivotally connected to the standard B, at the top and bottom, respectively, by bolts or pivots c, and their inner ends are pivotally attached to the upright portion A' of the frame by bolts or pivots c', which pass through one arm, a', of the upright portion, so that the standard is free to rise and fall without affecting the frame or axle portion proper.

D is a rod or link, the outer end, d, of which is pivotally connected to the standard B by passing through the standard, and the end d of the rod is held in place by a jam-nut, d', at the front side of the standard, and a nut, d'', at the rear side, which screw onto the inserted end of the link, and the inner end of the rod D is pivotally connected with the plow-standard by being turned and entering a socket on the standard or beam.

E is a brace running from the axle or frame A to the plow-beam, the outer end being attached to the axle by a clip, e', for which purpose the end e of the brace is flattened so as to fit the top of the axle; but it could be otherwise attached, and, as shown, the inner end is bolted to the plow-beam.

F is a brace-rod running from the upright A' to the plow-beam, and, as shown, the attachment to the plow-beam is made by means of a bolt, $f'$, which passes through the beam and through an eye, $f$, on each rod F, the same bolt also passing through the end of the brace E, and the attachment to the upright A' is made by flattening the end $f''$ of each brace F, and passing a bolt through the flattened end $f''$ and the arm $a'$ of the upright A', and, as shown, the end of one brace is attached by the same bolt that pivots the inner end of the upper bar, C, to the arm $a'$.

G is a plate having a socket, $g$, to receive the inner end of the rod D, which plate is secured in place by the bolt $f'$, which attaches the ends of the braces E F to the beam.

H represents supporting-plates, one for each side of the plow-beam, at the point of passage of the bolt $f'$, the plate, as shown, having at each end a flange, $h$, to fit over the edge of the beam, the object of the plates being to give the ends of the brace-rods a firm attachment to the beam.

I is the plow-beam, made of cast-steel or other suitable material, and curved in the form shown to have its rear end form the standard I', for attaching the plow.

J is the plow, of the usual construction, having a point, J', which point, when the plow is in use, projects forward of a vertical line passing through the center of the wheel-spindle, so that a circle passing through the center of the spindles will strike the plow at or near the point $j$, and this plow is supported by the beam in such relation to the wheels as that the landside face will be in line with a point on a vertical plane passing through the machine midway between the wheels, so that a circle struck to pass through the center of the wheels will have its center at the line of the landside, as shown at $j'$, Fig. 2, the result being that the plow is hung to have the turning-point at the intersection of a vertical plane passing through the wheel-spindles and a vertical plane midway between the wheels, which leaves the plow perfectly free in running, and allows it to be turned without affecting the frame or straining the wheels. As shown, the forward end of the plow-beam has on each side a strap, I'', with a depending portion provided with a series of holes, $i^3$, which holes receive the connecting-bolt $i$, for attaching a clevis, I''', the bolt $i$ passing through ears $i'$ on the clevis, and the clevis having a series of holes, $i''$, for adjustment of the hitch, the holes $i^3$ serving to adjust the draft.

K is a crank-shaft having a bent end, $k$, on which is an anti-friction collar or roller, $k'$, which lies beneath the plow-beam I, and, as shown, this crank-shaft K is supported in a bearing, $k''$, on the frame A, so that its end $k$ can be rocked to raise the plow-beam or allow the plow-beam to drop.

L is a lever, the lower end of which is firmly attached to the outer end of the crank-shaft K, so that by moving the lever the rod will be rocked to raise and lower its end $k$. The side of this lever has attached thereto a plate, L', the end of which overlies a rack, L'', attached to the frame A, and projecting out from the edge of the plate L' are ears $l'$, in which is mounted a sliding dog or latch, $l$, which is thrown down by a coiled spring, $l''$, and this latch has attached thereto a rod, $l^3$, running to a bell-crank lever, $l^4$, by means of which the end of the latch is released from the notches $l^5$ of the rack L'', the spring $l''$ throwing the latch into engagement with the notches. The lever L adjusts the end $k$ of the rod K for the position of the plow-beam, and by means of the latch $l$ and rack L'' the lever and rod are held in any required adjusted position.

M is a lever, the forward end of which has a fork, M', and this fork at the extreme end has a fork, M'', which receives the upper end of the upright A', and to which it is pivoted by a bolt or pivot, $n^3$.

N is a bar, the lower end of which is pivotally attached by a bolt or pivot, $n$, to the lower bar, C, and its upper end is flattened out and widened to form a head, N', one edge of which is provided with a series of notches, $n'$, with which the end of a sliding dog, $m$, carried by ears $m'$, projecting out from the lever M, engages. The dog is thrown into the notch by a coiled spring, $m''$, and is withdrawn by a rod, $m^3$, and a bell-crank lever, $m^4$, and the head N' lies between the fork M', and is secured in place by a bolt or pivot, $n''$, passing through the fork and the head N'. The lever M and the rod N with the head N' operate to raise or lower the standard B and lock such standard in any desired adjusted position, as required, to have the wheel carried by the spindle $b$ run properly to make the plow run level.

O O' is a bracket, the horizontal portions O being bolted or otherwise secured to the standard portion of the beam I, so that the vertical portion O' stands at the rear of such standard.

P is a wheel mounted in a bracket or arm, P', the head of which is formed of two rings or collars, $p$, between which around the stem O' of the bracket is a collar, $o$, which can be locked in any desired position on the stem by a suitable set-screw, or otherwise, so as to adjust the forward end of the arm or bracket P' at any desired height to have the heel of the plow run parallel.

Q is a seat mounted upon a standard, Q', which standard, as shown, is attached to the plow-beam by stirrups $q$.

R is a hitch or draw rod, the rear end of which is attached to the plow-beam by a bolt, $r$, or in any other suitable firm manner, and this rod extends forward in a diagonal direction and then turns and crosses the beam at or near its front end, and the front end of the rod is turned down and passed through the beam and there held by a nut or otherwise, and this portion R' stands some distance above the plane of the beam, as shown in Fig. 1.

S is a frame attached to the portion R' of the draw-rod R by straps S', and this frame S is provided with holes s s', through which bolts can be passed for the attachment of a tongue, when desired, as shown by the dotted lines in Fig. 5. The tongue can be made a loose or pivoted one by removing the forward bolt, s, leaving the connection with the frame S by the rear bolt only, and for a rigid tongue the bolts are passed through both holes s.

T is the furrow-wheel, and T' the land-wheel. The furrow-wheel is mounted on the spindle $a$ and the land-wheel on the spindle $b$.

The operation is as follows: When the plow is to be run without a tongue, the hitch is made directly to the clevis I' I'', the adjustment of the clevis being such as required for the equalization of the draft and for regulating the running depth, and with a tongue the hitch is also made direct to the clevis I' I'', and the purpose of the tongue is to prevent the plow from running on the horses and as a guide in turning. The driver mounted on the seat Q regulates the running depth of the plow by means of the lever L and rock shaft or rod K, by means of which the beam can be lowered and locked in the position required for the running depth, and when the required running depth is adjusted the plow can be leveled by the operator taking hold of the lever M, and, through the rack-bar N, raising or dropping the landside of the machine to the required degree for the plow to run level, and when this adjustment has been made the rear or caster wheel, P, can be adjusted on its bracket O O', for the running depth of the heel to correspond with that of the point, the running depth of the point being controlled, as before stated, by the clevis I' I''. The plow, when running, will not strain the wheels or the frame-work through the location of the point on which it turns at the cross-section of vertical, transverse, and longitudinal lines passing through the wheel and the frame, as already described, and by supporting the spindle for the land-wheel by pivoted bars the adjustment for leveling purposes is accomplished by simply adjusting the frame through the pivoted bars which carry the arm of the land-wheel; and it will further be seen that these bars, in connection with the pivoted link D, swing the plow in all respects as if carried by a crank-axle, so that the plow will adapt itself to inequalities in the ground, and can pass obstructions without affecting the framing; and such movements are further permitted by reason of the rocking rod, which controls the lowering of the beam, being wholly disconnected from the beam, leaving the beam free to rise when the plow runs over an obstruction or passes inequalities. The rear or caster wheel being also adjustably attached in place the heel can be readily adjusted to correspond with the point, and this wheel, being attached through the bracket secured to the standard, permits the plow to be readily removed for repairs, or in case of breakage without disconnecting the rear supporting-wheel. The frame and axle are formed from a single piece, as shown, or of two pieces suitably secured together, and this frame, through the connecting-braces with the plow-beam gives an oscillating movement, by which the plow can be run out of the ground, the frame pitching forward and assisting the act of running the plow out of the ground; and this construction of frame and support for the plow carries the plow, in effect, the same as if a bail were used, thus giving all the benefits arising from the use of a bail, together with the benefits arising from the use of the three wheels, and it will be seen that in raising the plow a resistance is provided for the rear end through the caster or rear wheel, P, by which means the plow will be raised bodily and carried. The oscillation of the frame is permitted by the pivoting of the braces at or near the point where the standard of the beam begins, which not only permits the frame to oscillate, but also gives an easy riding movement for the plow. The adjustable caster-wheel also enables the heel of the plow to be lowered as the plow wears in use, so that the suction can be maintained after the plow has become worn, the same as when it was first started, which is a great advantage in the use of plows; and by the construction and arrangement shown and described a light frame is provided, possessing the requisite strength and rigidity for the operation of the plow, and the plow is supported or hung so as to ride freely in passing obstructions or on uneven ground, and the running depth and proper level can be readily and quickly adjusted, and when adjusted maintained, and the location of the turning-point at the center longitudinally and transversely gives a working position for the beam and plow, by which the straining of the machine is prevented to a large extent, all of which features are essential to the operation of the plow.

The frame S is made wide, so as to make a tongue to be attached for a two or a three horse hitch. A two-horse hitch is provided when the tongue is secured in line with the holes s, and a three-horse hitch is had by attaching the tongue in line with the holes s'. This frame S and attaching-rod R can be furnished as an attachment to the plow, but are not required, except a tongue is to be used.

What I claim as new, and desire to secure by Letters Patent, is—

1. The axle-bar A, having at its inner end an upright portion, A', in line with the wheel-centers, said upright portion being composed of two arms, $a'$ $a'$, adapted to form a support for the plow-beam and its raising devices in such a manner as to leave the land-wheel side clear for the suspending-rods of the land-wheel spindle, substantially as specified.

2. The combination, with the axle-bar A, carrying the furrow-wheel and provided at its inner end with an upright portion, A', for supporting the plow-beam and its raising devices, of the standard B, carrying the land-wheel, and a pivotal connection, C C, between the parts A' and B, for operating the standard B independent of the axle-bar A, substantially as specified.

3. The combination, with the support A A' and arm B, of the connecting-links C and a lever for raising and lowering the land-wheel of the plow, substantially as specified.

4. The combination, with the furrow and land wheels T T', the axle A A', and the plow-beam I, located between the said wheels and having a socket, $g$, of the land-wheel standard B, having a spindle, $b$, carrying the land-wheel, and the rod D, pivoted at its outer end to the said standard and at its inner end in the socket on the beam, substantially as and for the purpose described.

5. The combination, with the land-wheel standard B and axle A', of the links C C, rod D, and lever M, for furnishing a support for and a free vertical movement of said standard, substantially as specified.

6. The combination, with the support A A' and plow-beam I, of the brace-rods E F, substantially as and for the purposes specified.

7. The support A A' and arm B, in combination with the links C, rod D, and braces or rods E F, substantially as and for the purposes specified.

8. The arm B and rod D, in combination with the socket G and plow-beam I, for pivotally connecting the arm with the plow-beam, substantially as and for the purpose specified.

9. The combination, with a plow-beam and a frame therefor, of a pivotal support for the beam, a lever, and a shaft connected with the lever and having its acting end beneath and unattached to the plow-beam, and acting on the latter forward of the frame for lifting the latter and leaving it free, substantially as and for the purposes described.

10. The combination, with a bar or support, A A', and a plow-beam, I, carried by the bar or support, of a pivotal support for the beam at the rear of the frame, and a lifting rod or arm, K, having its acting end beneath and unattached to the plow-beam and acting on the beam forward of the frame in an upward direction, substantially as and for the purpose specified.

11. The axle A A', arm B, and links C, in combination with the lever M, and rack-rod N, for furnishing a support and lift for the arm, substantially as specified.

12. The rocking or swinging frame, in combination with a plow-beam, and rods F extending rearward from the frame and pivoted to the beam, whereby the frame is rocked by raising or lowering the plow, substantially as specified.

13. The combination, with a plow-beam, a frame therefor, and supporting-wheels, of the draw-rod R, connected at its rear end with the beam and provided at its forward end with a transverse extension, R', and the frame S, pivoted to the transverse part of the rod and provided with means for the attachment of a tongue thereto, substantially as described.

14. The combination, with a plow-beam and plow carried thereby, of the carrying-wheels, the caster-wheel, and the frame having a central pivotal or turning point, said wheels being equidistant from said pivotal or turning point, thereby preventing strain on the frame, substantially as described.

JOHN F. PACKER.

Witnesses:
ALBERT H. ADAMS,
EDGAR T. BOND.